United States Patent
Nishino (10) Patent No.: US 9,423,990 B2
(45) Date of Patent: Aug. 23, 2016

(54) NON-TRANSITORY COMPUTER READABLE RECORDING MEDIUM STORING AN ACCOUNT MANAGEMENT PROGRAM, IMAGE FORMING APPARATUS AND IMAGE FORMING SYSTEM

(71) Applicant: KYOCERA Document Solutions Inc., Osaka OT (JP)

(72) Inventor: Tetsuya Nishino, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/923,054

(22) Filed: Oct. 26, 2015

(65) Prior Publication Data

US 2016/0124689 A1     May 5, 2016

(30) Foreign Application Priority Data

Nov. 4, 2014    (JP) ................. 2014-224626

(51) Int. Cl.
*G06K 15/00*      (2006.01)
*G06F 3/12*      (2006.01)

(52) U.S. Cl.
CPC ........... *G06F 3/1222* (2013.01); *G06F 3/1238* (2013.01); *G06F 3/1288* (2013.01); *G06F 3/1292* (2013.01)

(58) Field of Classification Search
CPC .. G06F 3/1238; G06F 3/1288; G06F 3/1292; G06F 3/1222
USPC ....................................................... 358/1.14
See application file for complete search history.

(56) References Cited

U.S. PATENT DOCUMENTS

| 2009/0037336 | A1* | 2/2009 | Sunata | ................. | G06F 21/105 705/59 |
| 2014/0230075 | A1* | 8/2014 | Cheminot | ............... | G06F 21/10 726/28 |
| 2015/0033293 | A1* | 1/2015 | Nishida | ................. | G06F 21/608 726/4 |

FOREIGN PATENT DOCUMENTS

JP     2006-173949     6/2006

* cited by examiner

*Primary Examiner* — Allen H Nguyen (57) ABSTRACT

A non-transitory computer readable recording medium stores an account management program. The account management program causes a computer in a mobile terminal apparatus to perform the steps of: receiving service table data from an image forming apparatus and storing the service table data in the mobile terminal apparatus; receiving account information required to use a service from a user; storing the account information in the mobile terminal apparatus so as to associate the account information with the service; receiving an identification code of the service when the user logs in the image forming apparatus, and storing the identification code in the mobile terminal apparatus so as to associate the identification code with the account information associated with the service; and receiving the identification code from the image forming apparatus when performing the service, and transmitting to the image forming apparatus the account information associated with the received identification code.

5 Claims, 6 Drawing Sheets

| SERVICE NAME |
| --- |
| FILE TRANSFER (SMB) |
| EMAIL TRANSMISSION (POP before SMTP) |
| FAX SERVER |
| CLOUD STORAGE |

| SERVICE NAME | ACCOUNT INFORMATION |
|---|---|
| FILE TRANSFER (SMB) | (USER NAME, PASSWORD) |
| EMAIL TRANSMISSION (POP before SMTP) | (ACCOUNT NAME, PASSWORD) |
| FAX SERVER | (USER NAME, PASSWORD) |
| CLOUD STORAGE | (USER NAME, PASSWORD) |

FIG. 6

| SERVICE NAME | ACCOUNT INFORMATION | ID CODE |
|---|---|---|
| FILE TRANSFER (SMB) | (USER NAME, PASSWORD) | AAAAAA |
| EMAIL TRANSMISSION (POP before SMTP) | (ACCOUNT NAME, PASSWORD) | BBBBBB |
| FAX SERVER | (USER NAME, PASSWORD) | CCCCCC |
| CLOUD STORAGE | (USER NAME, PASSWORD) | DDDDDD |

NON-TRANSITORY COMPUTER READABLE RECORDING MEDIUM STORING AN ACCOUNT MANAGEMENT PROGRAM, IMAGE FORMING APPARATUS AND IMAGE FORMING SYSTEM

CROSS-REFERENCE TO RELATED APPLICATIONS

This application relates to and claims priority rights from Japanese Patent Application No. 2014-224626, filed on Nov. 4, 2014, the entire disclosures of which are hereby incorporated by reference herein.

BACKGROUND

1. Field of the Present Disclosure

The present disclosure relates to a non-transitory computer readable recording medium, an image forming apparatus, and an image forming system.

2. Description of the Related Art

In a system, a client apparatus transmits a job to a document processing apparatus, and if authentication of the client apparatus is succeeded, then the document processing apparatus executes the job.

In addition, when performing a service (file transfer, email transmission or the like for an image data file) using communication with an external server, an image forming apparatus accesses the external server, and performs the service after successful user authentication other than the aforementioned authentication for a job to be executed in the image forming apparatus. Such an image forming apparatus stores account information (a user name and a password, or the like) required for user authentication in the external server and stores the account information as user data or the like in advance in an internal non-volatile storage device in advance, and reads the account information corresponding to a service to be performed and accesses the external server using the account information.

However, in a case that account information used for accessing an external server is stored in an image forming apparatus as mentioned, there is possibility that the account information is improperly read from the image forming apparatus and therefore it is not favorable from the perspective of security. In addition, in a case that plural users use plural image forming apparatuses in an office or the like, such account information of all users must be set in every image forming apparatus in advance, and therefore it is inconvenience. Further, if such account information is not stored in an image forming apparatus, in general, a user must input such account information every time, and therefore it is inconvenience.

SUMMARY

A non-transitory computer readable recording medium according an aspect of the present disclosure stores an account management program. The account management program causes a computer in a mobile terminal apparatus of a user to perform the steps of: receiving service table data from an image forming apparatus and storing the service table data in the mobile terminal apparatus, the service table data indicating a service that (a) requires communication with an external server on a network and (b) requires user authentication and (c) can be performed by the image forming apparatus; receiving account information required to use the service when the account information is inputted by a user; storing the received account information in the mobile terminal apparatus so as to associate the account information with the service; receiving an identification code of the service, the identification code issued every time when the user logs in the image forming apparatus, and storing the received identification code in the mobile terminal apparatus so as to associate the identification code with the account information associated with the service of the identification code; and receiving the identification code transmitted by the image forming apparatus when the image forming apparatus performs the service, and transmitting to the image forming apparatus the account information associated with the received identification code.

An image forming apparatus according to an aspect of the present disclosure includes a storage device, a service table transmitting unit, a login processing unit, an identification code transmitting unit, and a service processing unit. In the storage device, service table data is stored, and the service table data indicates a service that requires communication with an external server on a network. The service table transmitting unit is configured to transmit the service table data to a mobile terminal apparatus of a user. The login processing unit is configured to perform a login process of the user. The identification code transmitting unit is configured to newly generate an identification code of the service every time when the user logs in the image forming apparatus, and transmit the generated identification code to the mobile terminal apparatus. The service processing unit is configured to (a) transmit to the mobile terminal apparatus the identification code generated for the service to be performed, (b) receive the account information from the mobile terminal apparatus, the account information inputted by the user and stored in the mobile terminal apparatus for the service corresponding to the identification code, and (c) perform the service after user identification performed by the external server on the basis of the received account information.

An image forming system according to an aspect of the present disclosure includes the aforementioned mobile terminal apparatus and the aforementioned image forming apparatus.

These and other objects, features and advantages of the present disclosure will become more apparent upon reading of the following detailed description along with the accompanied drawings.

DETAILED DESCRIPTION

Hereinafter, an embodiment according to aspects of the present disclose will be explained with reference to drawings.

Figure 1:
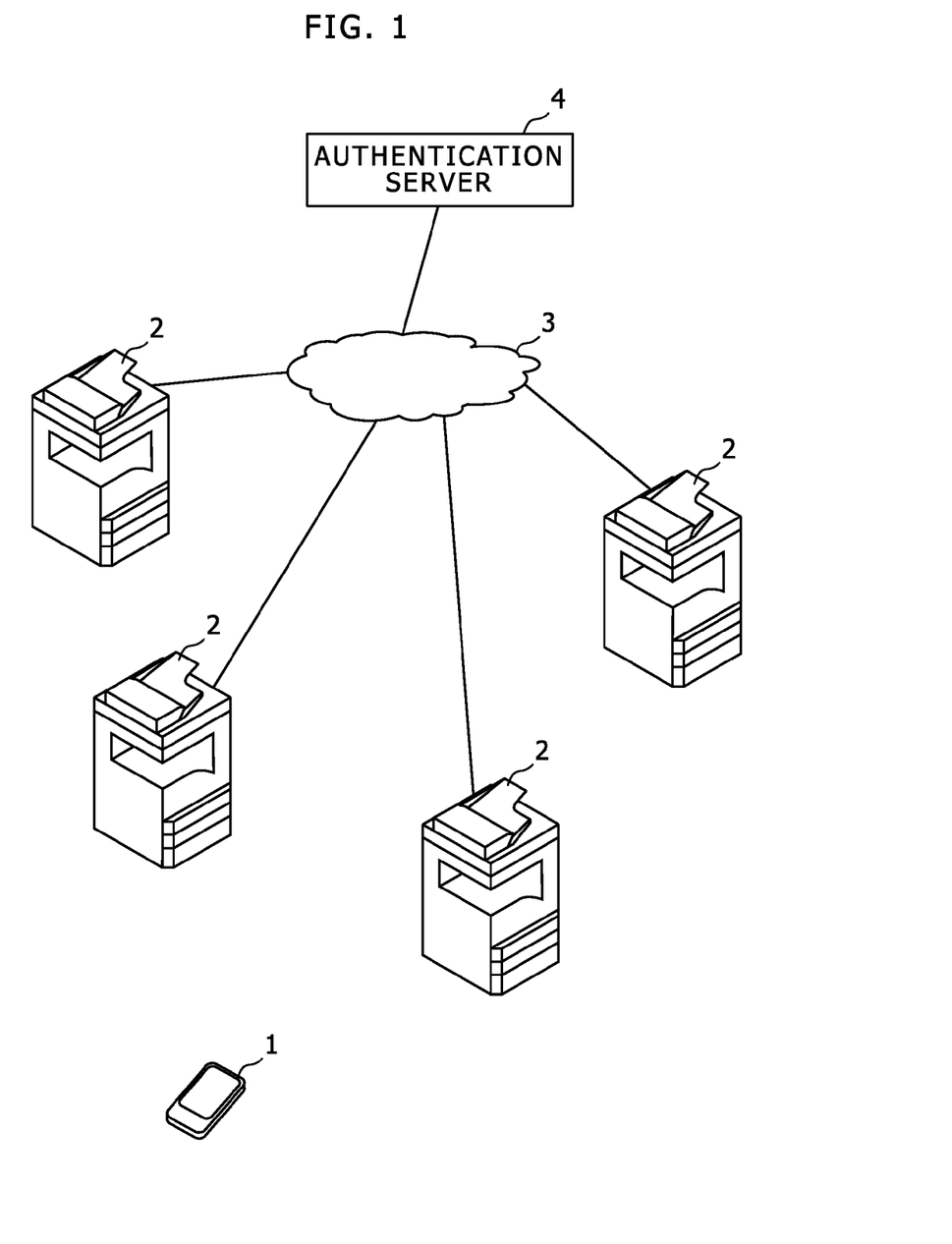
FIG. 1 shows a block diagram that indicates a configuration of an image forming system in an embodiment of the present disclosure.

FIG. 1 shows a block diagram that indicates a configuration of an image forming system in an embodiment of the present disclosure. In the system shown in FIG. 1, a user carries a mobile terminal apparatus 1 such as a smartphone, and plural image forming apparatuses 2 (multi function peripherals, copiers or the like) are installed and each one of the image forming apparatuses 2 is connected to a network 3. When the mobile terminal apparatus 1 is located near the installing place of the image forming apparatus 2, the mobile terminal apparatus 1 is capable of communicating with the image forming apparatus 2, for example, using a near field wireless communication.

Further, an authentication server 4 is connected to the network 3. The authentication server 4 is, for example, a server that performs a directory service (such as a domain controller of Active Directory), and performs a user authentication process of the image forming apparatus 2.

The network 3 is an on-site LAN (Local Area Network), Internet, and/or the like, and on the network 3, the image forming apparatus 2 is capable of communicating with a server on the network 3 such as the authentication server 4.

Figure 2:
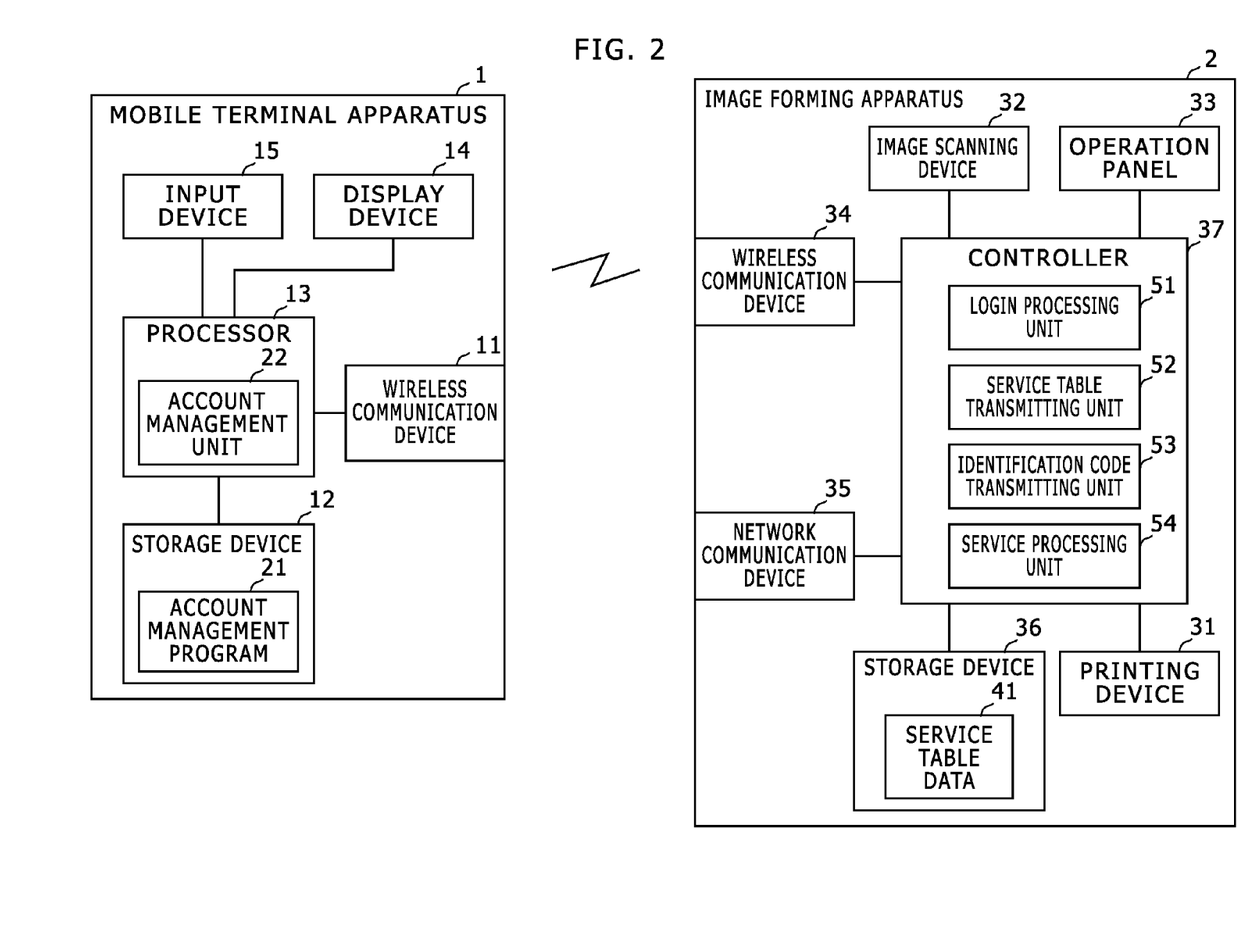
FIG. 2 shows a block diagram that indicates a configuration of the mobile terminal apparatus 1 and the image forming apparatus 2 shown in FIG. 1.

FIG. 2 shows a block diagram that indicates a configuration of the mobile terminal apparatus 1 and the image forming apparatus 2 shown in FIG. 1.

The mobile terminal apparatus 1 is, for example, a portable device such as a smartphone, and includes a wireless communication device 11, a storage device 12, a processor 13, a display device 14, an input device 15 and the like.

The wireless communication device 11 is an internal device that performs data communication according to a predetermined near field wireless communication standard such as Bluetooth (registered trademark).

The storage device 12 is a non-volatile storage device such as a flash memory or a hard disk. In the storage device 12, an account management program 21 and the like are stored. The account management program 21 may be recorded in a portable non-transitory computer readable recording medium (such as CD-ROM). Further, the account management program 21 may be installed from the recording medium to the storage device 12.

The processor 13 is a computer that includes a CPU (Central Processing Unit), a RAM (Random Access Memory), a ROM (Read Only Memory) and the like, and loads the account management program 21 to the RAM and executes the account management program 21 using the CPU, and thereby acts as an account management unit 22.

The account management unit 22 (a) receives service table data mentioned below from the image forming apparatus 2 and stores the service table data in the mobile terminal apparatus 1, and (b) receives account information required to use the service when the account information is inputted by a user and stores the received account information in the mobile terminal apparatus 1 so as to associate the received account information with the service. The account information is information used for user authentication performed by an external server, such as a user name and a password identified on the basis of a user operation to the input device 15.

Further, an identification code is issued every time when the user of the mobile terminal apparatus 1 logs in the image forming apparatus 2, and the account management unit receives the identification code of the service and stores the received identification code in the mobile terminal apparatus 1 so as to associate the identification code with the account information associated with the service of the identification code.

Further, when the image forming apparatus 2 performs a service in a login period (i.e. a period from login to logout), the image forming apparatus 2 transmits the identification code of the service to the mobile terminal apparatus 1, and the account management unit 22 receives the transmitted identification code of the service and transmits as its response to the image forming apparatus 2 the account information associated with the received identification code.

Using the wireless communication device 11, the account management unit 22 performs the aforementioned data communication with the image forming apparatus 2.

Further, once detecting the logout of the user on the basis of a notice or the like from the image forming apparatus 2, the account management unit 22 may remove the identification code received at the login from the mobile terminal apparatus 1. Alternatively, at the next login, the account management unit 22 may overwrite the current identification code with the identification code received at the next login.

Further, the display device 14 is a liquid crystal display or the like that display sorts of information and an operation screen to a user. The input device 15 includes a touch panel, a hard key or the like, and receives a user operation.

On the other hand, in FIG. 2, the image forming apparatus 2 is a multi function peripheral or the like used by registered plural users, and includes a printing device 31, an image scanning device 32, an operation panel 33, a wireless communication device 34, a network communication device 35, a storage device 36, and a controller 37.

The printing device 31 is an internal device that prints each page image based on print image data on a paper sheet using electrophotography.

The image scanning device 32 is an internal device that optically scans a document image of a document and thereby generates image data (i.e. scanning data) of the document image.

The operation panel 33 is arranged on a surface of a housing of the image forming apparatus 2, and includes a display device that displays sorts of information to a user and an input device that detects a user operation. For example, a liquid crystal display is used as the display device. A key switch, a touch panel or the like is used as the input device.

The wireless communication device 34 is an internal device that performs data communication according to a predetermined near field wireless communication standard such as Bluetooth (registered trademark). The network communication device 35 is a circuit that is connected to the network 3 and performs data communication with another apparatus connected to the network 3.

Further, the storage device 36 is a non-volatile storage device such as a flash memory or a hard disk. In the storage device 36, service table data 41 and the like are stored.

The service table data 41 indicates a service that (a) requires communication with an external server (e.g. a file server, an email server, a cloud server, a facsimile server or the like) on a network and (b) can be performed by the image forming apparatus 2. For an image data file of an image scanned by the image scanning device 32, such a service includes (a) file transfer that transmits the file to the external server in accordance with SMB (Server Message Block), FTP (File Transfer Protocol) or the like, (b) email transmission that transmits the file to an email server in accordance with a protocol such as POP before SMTP, (c) file save to a cloud storage service, (d) file download from a cloud storage service and image printing based on the downloaded file, (e) facsimile transmission of an image based on the file using a facsimile server, or the like. It should be noted that such a service becomes available after user authentication independently performed for each service, and usually a user information (a user name and a password) registered for each service is different from user information used for the login to the image forming apparatus 2.

Figure 3:
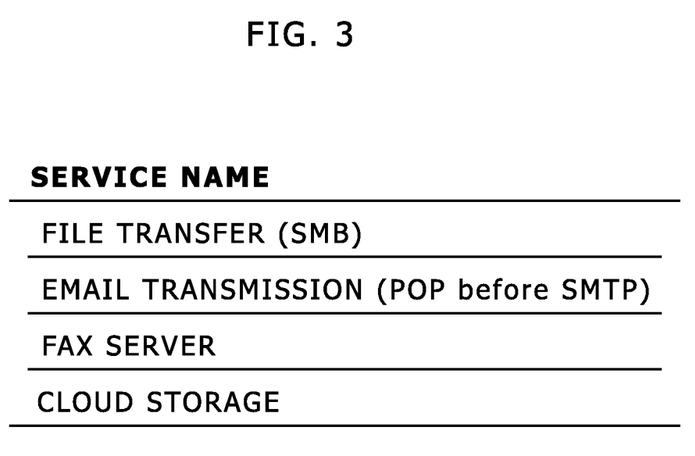
FIG. 3 shows a diagram that indicates an example of the service table data 41 stored in advance in the image forming apparatus 2 shown in FIG. 2.

FIG. 3 shows a diagram that indicates an example of the service table data 41 stored in advance in the image forming apparatus 2 shown in FIG. 2.

In a case of the service table data 41 shown in FIG. 3, in the service table data 41, services are described in an order common to all of the image forming apparatuses 2 in the system. In an example shown in FIG. 3, the first record is a record for file transfer, the second record is a record for email transmission, the third record is a record for facsimile transmission performed by a facsimile server, and the fourth record is a record for file save performed by a predetermined cloud storage service. In this case, the mobile terminal apparatus 1 identifies the order of services on the basis of the received service table data 41.

If the order common to all of the image forming apparatus 2 in the system is not used, then for example, the service table data 41 may include service type codes unique to services and services may be specified using the service type codes. In such a case, the aforementioned service of the account information and the aforementioned service of the identification code are identified from the service type codes. In this case, the mobile terminal apparatus 1 identifies a relationship between the service type codes and the services on the basis of the received service table data 41.

Further, the controller 37 includes a computer, ASIC (Application Specific Integrated Circuit) and/or the like, and controls internal devices of the image forming apparatus 2. The controller 37 executes a program using the computer and thereby forms a login processing unit 51, a service table transmitting unit 52, an identification code transmitting unit 53, and a service processing unit 54.

The login processing unit 51 performs a login process of a user. Specifically, once detecting a user operation to the operation panel 33 (such as inputting a user ID and a password, presenting an ID code to an unshown card reader or the like), the login processing unit 51 performs user authentication using the authentication server 4 on the basis of the user ID or the like obtained from the user operation, and if the user authentication is succeeded, then the login processing unit 51 allows the login to the image forming apparatus 2, and if the user authentication is failed, then the login processing unit 51 refuses the login to the image forming apparatus 2.

The service table transmitting unit 52 reads the service table data 41 from the storage device 36 and transmits the service table data 41 to the mobile terminal apparatus 1 of the user.

The service table transmitting unit 52 may automatically transmit the service table data 41, for example, when the wireless communication device 34 detects the mobile terminal apparatus 1. In such a case, the service table transmitting unit 52 may inquire the mobile terminal apparatus 1 of whether the mobile terminal apparatus 1 has already stored the service table data 41 and may not transmit the service table data 41 if the mobile terminal apparatus 1 has already stored the service table data 41.

Further, the service table transmitting unit 52 may transmit the service table data 41 when detecting a predetermined user operation after the login of the user. In such a case, the service table transmitting unit 52 may record a user who performs transmission of the service table data 41 and may not transmit the service table data 41 for the user if the user performed transmission of the service table data 41 in the past.

The identification code transmitting unit 53 newly generates an identification code of the service every time when the user logs in the image forming apparatus 2, and transmits the generated identification code to the mobile terminal apparatus 1. The identification code transmitting unit 53 transmits the identification code to the mobile terminal apparatus 1 that the logging-in user carries, through near field communication using the wireless communication device 34.

The service processing unit 54 (a) when a service described in the service table data 41 is performed, transmits an identification code generated for the service to the mobile terminal apparatus 1 using the wireless communication device 34, (b) receives account information corresponding to the identification code (i.e. account information inputted by a user and stored in the mobile terminal apparatus 1 for a service corresponding to the identification code) from the mobile terminal apparatus 1 using the wireless communication device 34, and (c) performs the service using the network communication device 35 after user authentication performed by an external server (i.e. a server of the service) with the received account information.

For example, for file transfer, the service processing unit 54 transmits the image data file to an SMB server that runs in a user terminal apparatus set in advance by a URI (Universal Resource Identifier), an IP (Internet Protocol) address or the like.

Figure 4:
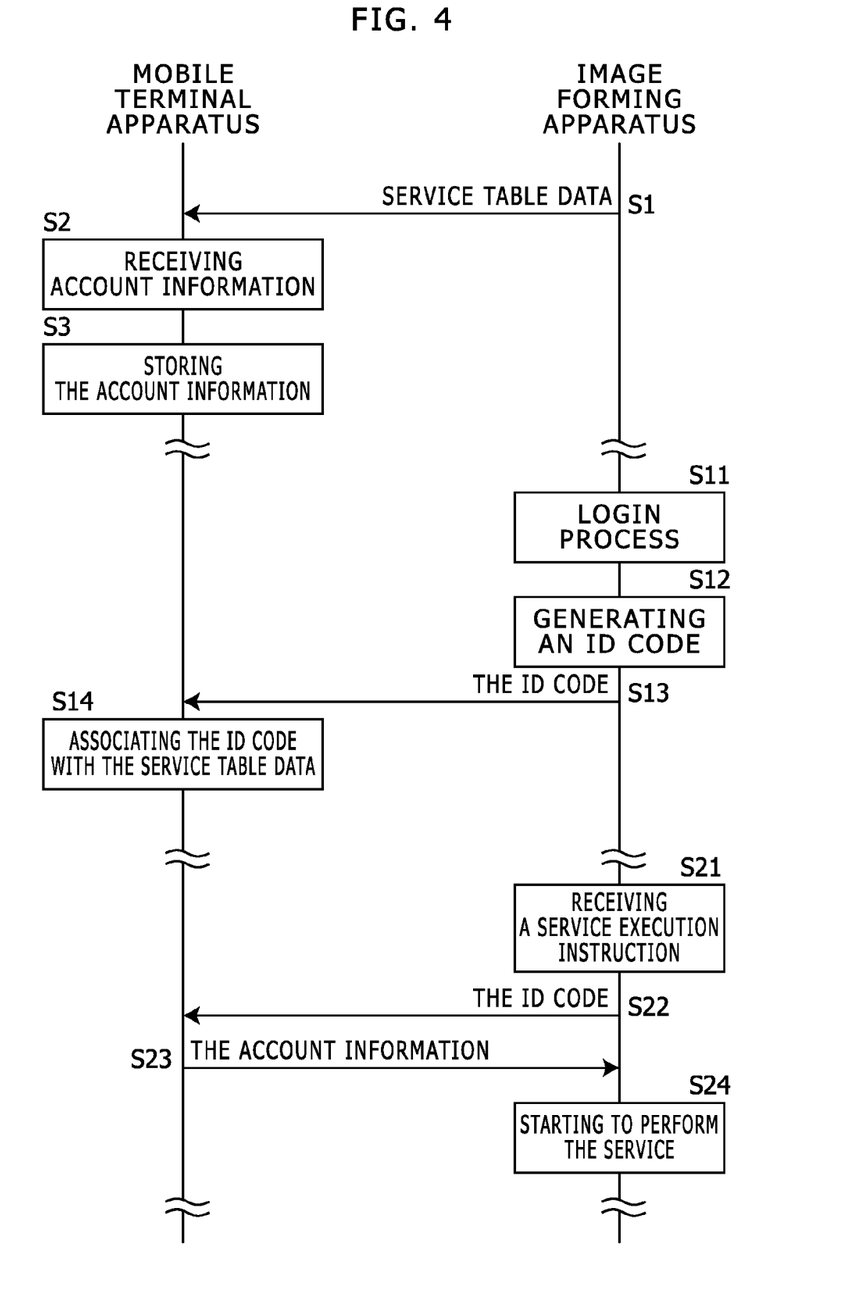
FIG. 4 shows a sequence diagram that explains a behavior of apparatuses in the image forming system shown in FIG. 1.

The following part explains a behavior of apparatuses in the image forming system shown in FIG. 1. FIG. 4 shows a sequence diagram that explains a behavior of apparatuses in the image forming system shown in FIG. 1.

Firstly, the service table transmitting unit 52 of the image forming apparatus 2 reads the service table data 41 from the storage device 36 on the basis of a predetermined condition as mentioned, and transmits the service table data to the mobile terminal apparatus 1 using the wireless communication device 34 (in Step S1).

The account management unit 22 of the mobile terminal apparatus 1 receives the service table data using the wireless communication device 11 and stores the service table data in the storage device 12.

Further, on the display device 14, the account management unit 22 displays an input screen of account information for a service described in the received service table data.

A user operates the input device 15 and thereby inputs the account information for each service into the input screen.

The account management unit 22 identifies the account information inputted by the user for each service (in Step S2), and stores the account information in the storage device 12 so as to associate the account information with the service (in Step S3).

Figure 5:
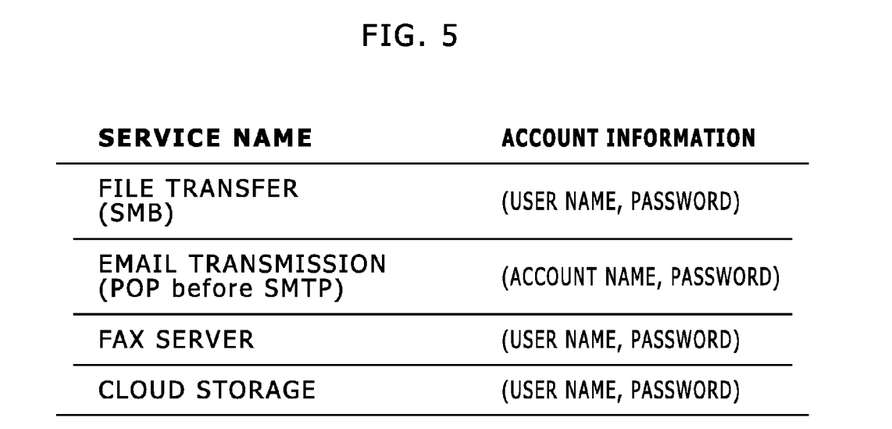
FIG. 5 shows a diagram that indicates an example of the account information that is associated with the service table data and is stored in the mobile terminal apparatus 1 shown in FIG. 2.

FIG. 5 shows a diagram that indicates an example of the account information that is associated with the service table data and is stored in the mobile terminal apparatus 1 shown in FIG. 2. For example, as shown in FIG. 5, the account management unit 22 adds the account information in the service table data stored in the storage device 12 so as to associate the account information with each service.

In such a manner, in the mobile terminal apparatus 1, the account information inputted by the user is stored for each service.

Subsequently, when the user uses the image forming apparatus 2, the user performs an operation for login using the operation panel 33.

In the image forming apparatus 2, once detecting the user operation, the login processing unit 51 performs a login process (i.e. allowing login on the basis of user authentication) (in Step S11).

Once allowing the login by the login processing unit 51, the identification code transmitting unit 53 newly generates an identification code of each one of all services described in the service table data 41 (in Step S12). In this process, the identification code transmitting unit 53 generates the identification code on the basis of a random number or the like. An identification code of a service is generated so as to be different from identification codes of the other services. The identification code transmitting unit 53 maintains the identification code generated for each service so as to associate the identification code with the user until the logout of the user, and discards the identification code at the logout. The identification code transmitting unit 53 transmits the generated identification code to the mobile terminal apparatus 1 using the wireless communication device 34 (in Step S13).

In the mobile terminal apparatus 1, for each service, the account management unit 22 receives the identification code using the wireless communication device 11, and stores the received identification code in the storage device 12 so as to associate the identification code with the account information (in Step S14).

In this process, as mentioned, if services are described in the service table data 41 in the order common to all of the image forming apparatuses 2 in the system, then the identification code transmitting unit 53 arranges and transmits the identification codes of the services in the order of the services described in the service table data 41. In this process, information that specifies the services such as service names are not transmitted together with the identification codes. Subsequently, the account management unit 22 stores the received identification codes in this order in the storage device 12 so as to associate the identification codes with the account information.

As mentioned, if the order common to all of the image forming apparatuses 2 in the system is not used and service type codes unique to the services are used, then the identification code transmitting unit 53 transmits a pair of the service type code and the identification code for each one of the services. In such a case, information that directly indicates the services such as service names are not transmitted together with the service type codes and the identification codes. Subsequently, for each pair, the account management unit 22 stores the received identification code in the storage device 12 so as to associate the identification code with the account information of the service specified by the received service type code.

Figure 6:
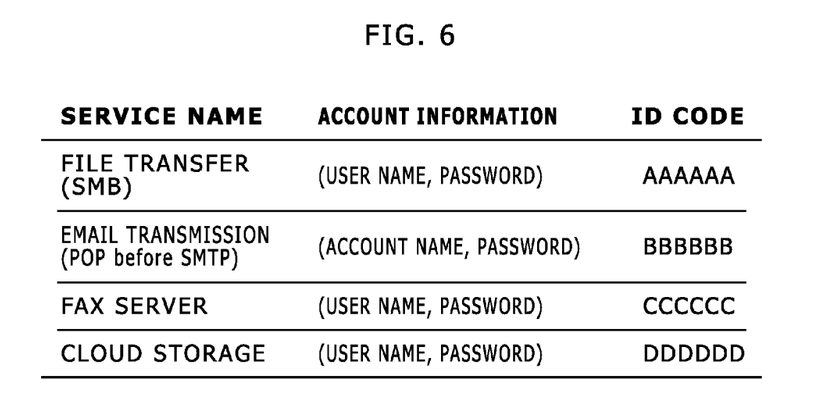
FIG. 6 shows a diagram that indicates an example of the identification code that is issued by the image forming apparatus shown in FIG. 2 for each service indicated by the service table data and is maintained in the mobile terminal apparatus 1 shown in FIG. 2.

FIG. 6 shows a diagram that indicates an example of the identification code that is issued by the image forming apparatus shown in FIG. 2 for each service indicated by the service table data and is maintained in the mobile terminal apparatus 1 shown in FIG. 2. For example, as shown in FIG. 6, the account management unit 22 adds the identification code into the service table data stored in the storage device 12 so as to associate the identification code with the account information of each service.

As mentioned, at login, an identification code is generated that is valid only during the logging-in period, and registered in the mobile terminal apparatus 1.

Afterward, the user operates the operation panel 33 of the image forming apparatus 2 that the user is logging in, and thereby instructs to perform a service (FILE TRANSFER, EMAIL TRANSMISSION or the like) described in the service table data 41.

The service processing unit 54 of the image forming apparatus 2 receives the instruction (in Step S21), identifies the identification code of the instructed service, and transmits the identified identification code to the mobile terminal apparatus 1 using the wireless communication device 34 (in Step S22).

In the mobile terminal apparatus 1, once receiving the identification code using the wireless communication device 11, the account management unit 22 reads the account information associated with the received identification code, and transmits the read account information to the image forming apparatus 2 using the wireless communication device 11 (in Step S23).

In the image forming apparatus 2, the service processing unit 54 receives the transmitted account information using the wireless communication device 34, and accesses a server of the service and thereafter performs the instructed service after user authentication based on the received account information (in Step S24).

If the service processing unit 54 failed to obtain the account information from the mobile terminal apparatus 1, then the service processing unit 54 displays an input screen of the account information on the operation panel 33, and performs the service using the account information inputted to the operation panel 33 by the user.

In the aforementioned embodiment, the mobile terminal apparatus 1 receives service table data from the image forming apparatus 2 and stores the service table data in the mobile terminal apparatus 1, and receives account information required to use a service when the account information is inputted by a user and stores the account information in the mobile terminal apparatus 1 so as to associate the account information with the service. Afterward, the mobile terminal apparatus 1 receives an identification code of the service that is issued every time when the user logs in the image forming apparatus 2, and stores the received identification code in the mobile terminal apparatus 1 so as to associate the identification code with the account information associated with the service of the identification code. Further, the mobile terminal apparatus 1 receives the identification code transmitted by the image forming apparatus 2 when the image forming apparatus 2 performs the service, and transmits to the image forming apparatus 2 the account information associated with the received identification code. The image forming apparatus 2 receives the account information from the mobile terminal apparatus 1, and performs the service after user identification performed by an external server on the basis of the received account information.

Therefore, a user stores account information in the mobile terminal apparatus 1 for a service accompanied by communication with an external server that requires user authentication, and uses the image forming apparatus using the mobile terminal apparatus 1 while the user carries the mobile terminal apparatus 1, and consequently it is not required to store the account information in the image forming apparatus 2 in advance and it is not required to input the account information to the image forming apparatus 2 when using the image forming apparatus 2.

In addition, as a transmission request of the account information, the different identification code login by login is transmitted from the image forming apparatus 2 to the mobile terminal apparatus 1, and therefore, even if the account information is wiretapped, it is difficult to identify a service corresponding to the wiretapped account information and consequently it achieves high security level.

The description has been presented for purposes of illustration and description, and is not intended to be exhaustive or limited.

For example, in the aforementioned embodiment, the image forming apparatus 2 performs user authentication using the authentication server 4 and thereby determines whether the login is allowed or not. Alternatively, it may be configured so that user registration data (user ID and password and the like) is stored in the image forming apparatus 2 in advance and it is determined whether the login is allowed or not by performing user authentication (i.e. local user authentication) based on the user registration data in the image forming apparatus 2.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A non-transitory computer readable recording medium storing an account management program, wherein the account management program causes a computer in a mobile terminal apparatus of a user to perform the steps of:
   receiving service table data from an image forming apparatus and storing the service table data in the mobile terminal apparatus, the service table data indicating a service that (a) requires communication with an external server on a network and (b) requires user authentication and (c) can be performed by the image forming apparatus;
   receiving account information required to use the service when the account information is inputted by a user;
   storing the received account information in the mobile terminal apparatus so as to associate the account information with the service;
   receiving an identification code of the service, the identification code issued every time when the user logs in the image forming apparatus, and storing the received identification code in the mobile terminal apparatus so as to associate the identification code with the account information associated with the service of the identification code; and
   receiving the identification code transmitted by the image forming apparatus when the image forming apparatus performs the service, and transmitting to the image forming apparatus the account information associated with the received identification code.

2. The non-transitory computer readable recording medium according to claim 1, wherein:
   the service table data includes a service type code unique to the service; and
   the service of the account information is identified from the service type code, and the service of the identification code is identified from the service type code.

3. The non-transitory computer readable recording medium according to claim 1, wherein:
   the account information is a user name and a password that are required for user authentication performed by the external server; and
   the external server includes at least one of a cloud server, a facsimile server, a file server and an email server.

4. An image forming apparatus, comprising:
   a storage device in which service table data is stored, the service table data indicating a service that requires communication with an external server on a network;
   a service table transmitting unit configured to transmit the service table data to a mobile terminal apparatus of a user;
   a login processing unit configured to perform a login process of the user;
   an identification code transmitting unit configured to newly generate an identification code of the service every time when the user logs in the image forming apparatus, and transmit the generated identification code to the mobile terminal apparatus; and
   a service processing unit configured to (a) transmit to the mobile terminal apparatus the identification code generated for the service to be performed, (b) receive account information from the mobile terminal apparatus, the account information inputted by the user and stored in the mobile terminal apparatus for the service corresponding to the identification code, and (c) perform the service after user identification performed by the external server on the basis of the received account information.

5. An image forming system, comprising:
   a mobile terminal apparatus of a user; and
   an image forming apparatus;
   wherein the mobile terminal apparatus is configured to
   (a) receive service table data from the image forming apparatus and store the service table data in the mobile terminal apparatus, the service table data indicating a service that (a1) requires communication with an external server on a network and (a2) requires user authentication and (a3) can be performed by the image forming apparatus;
   (b) receive account information required to use the service when the account information is inputted by the user;
   (c) store the received account information in the mobile terminal apparatus so as to associate the account information with the service;
   (d) receive an identification code of the service, the identification code issued every time when the user logs in the image forming apparatus, and store the received identification code in the mobile terminal apparatus so as to associate the identification code with the account information associated with the service of the identification code; and
   (e) receive the identification code transmitted by the image forming apparatus when the image forming apparatus performs the service, and transmit to the image forming apparatus the account information associated with the received identification code; and
   the image forming apparatus comprises:
   a storage device in which the service table data is stored;
   a service table transmitting unit configured to transmit the service table data to the mobile terminal apparatus;
   a login processing unit configured to perform a login process of the user;
   an identification code transmitting unit configured to newly generate an identification code of the service every time when the user logs in the image forming apparatus, and transmit the generated identification code to the mobile terminal apparatus; and a service processing unit configured to (f1) transmit to the mobile terminal apparatus the identification code generated for the service to be performed, (f2) receive the account information from the mobile terminal apparatus, the account information inputted by the user and stored in the mobile terminal apparatus for the service corresponding to the identification code, and (f3) perform the service after user identification performed by the external server on the basis of the received account information.

* * * * *